United States Patent [19]

Flesche

[11] Patent Number: 4,880,279
[45] Date of Patent: Nov. 14, 1989

[54] MODEL AUTOMOBILE RIM CONSTRUCTION

[76] Inventor: Fred Flesche, 204 Barnes Rd., Washingtonville, N.Y. 10992

[21] Appl. No.: 125,198

[22] Filed: Nov. 25, 1987

[51] Int. Cl.[4] .............................................. B60B 11/04
[52] U.S. Cl. .................................. 301/36 R; 301/5 R; 301/95; 301/114; 301/64 SD
[58] Field of Search ........................ 301/5 R, 5.3, 36 R, 301/63 R, 64 SD, 95, 96, 97, 98, 105 R, 111, 112, 113, 114, 117, 122, 1, 9 DH, 9 DN, 63 PW; 446/431, 465; 152/379.3, 379.4, 379.5

[56] References Cited

U.S. PATENT DOCUMENTS

| | | | |
|---|---|---|---|
| 1,666,703 | 4/1928 | Hunt | 301/36 R X |
| 1,897,375 | 2/1933 | Greenwald | 301/64 SD |
| 2,174,639 | 10/1939 | Sinclair | 301/64 SD X |
| 2,698,566 | 1/1955 | Stough | 301/36 R X |
| 3,403,875 | 10/1968 | Hartman | 301/36 R X |
| 3,532,384 | 10/1970 | Williams, Jr. | 301/36 R |
| 3,913,981 | 10/1975 | Hunden | 301/36 R |
| 4,220,372 | 9/1980 | Johansen et al. | 301/36 R X |
| 4,643,696 | 2/1987 | Law | 446/465 |

FOREIGN PATENT DOCUMENTS

| | | | |
|---|---|---|---|
| 620454 | 1/1927 | France | 301/9 DN |
| 2080212 | 2/1982 | United Kingdom | 301/36 R |

Primary Examiner—Russell D. Stormer
Attorney, Agent, or Firm—Klauber & Jackson

[57] ABSTRACT

A dual wheel or rim for supporting two tires in parallel for a radio-controlled automotive vehicle having an axle with a threaded end has a unitary generally hollow cylindrical body, an interior radially-extending web across the interior of the body, the web having a central aperture, ribs extending radially outwardly from the exterior of the body for reception of two tires in parallel, and a fastener engageable with the web of the body for securing the body to the threaded end of the axle of the vehicle.

6 Claims, 1 Drawing Sheet

MODEL AUTOMOBILE RIM CONSTRUCTION

FIELD OF THE INVENTION

This invention relates to rims for model automotive vehicles and is more particularly concerned with dual tire rims for radio-controlled model automobiles.

BACKGROUND OF THE INVENTION

Radio-controlled model automobiles are enjoyed today by a great number of people. They find excitement in the precise mechanism and excellent maneuverability of such models. Races and various competitions are regularly organized. The bodies of such models are ordinarily formed from various synthetic resinous materials such as polyvinylchloride or polycarbonate, polystyrene or phenolics, but they comprise various metal components including axles and wheels. The tires are generally of rubber or plastic sponge or are pneumatic rubber tires with various tread patterns and configurations or are simply hollow formed from an appropriate plastic material.

Wheels for effectively and positively supporting the tires are an important component of such models, and it is, of course, important to have them securely attached to the model but to be capable of being readily released when desired. It is particularly desired to have a wheel or rim which will accommodate two tires in parallel rather than only a single tire, in particular when increased traction is desired.

It is accordingly an object of the present invention to provide an improved wheel or rim for a radio-controlled model automotive vehicle.

It is another object of the invention to provide a wheel of the character indicated which will readily accommodate two tires in parallel.

It is a further object of the invention to provide a wheel or dual tire mounting for radio-controlled automotive vehicles which it can be readily secured to the vehicle but is readily detachable therefrom.

SUMMARY OF THE INVENTION

In accordance with the invention, there is provided a wheel or rim for a radio-controlled model automotive vehicle which comprises a substantially cylindrical body closed adjacent one end by a radially extending web and having a plurality of spaced radially extending fins on its exterior. The web is apertured to receive an adapter unit which is constructed to be threadedly engaged with the end of the axle of the model vehicle.

Other objects and features of the invention will be readily apparent from the following detailed description of illustrative embodiments and from the drawings,

DETAILED DESCRIPTION OF PREFERRED EMBODIMENTS

Figure 1:
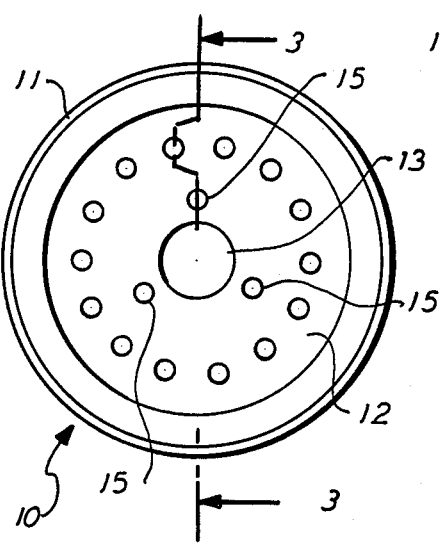
FIG. 1 is an end elevation of a wheel embodying features of the present invention as seen from the open end of the wheel.
Figure 2:
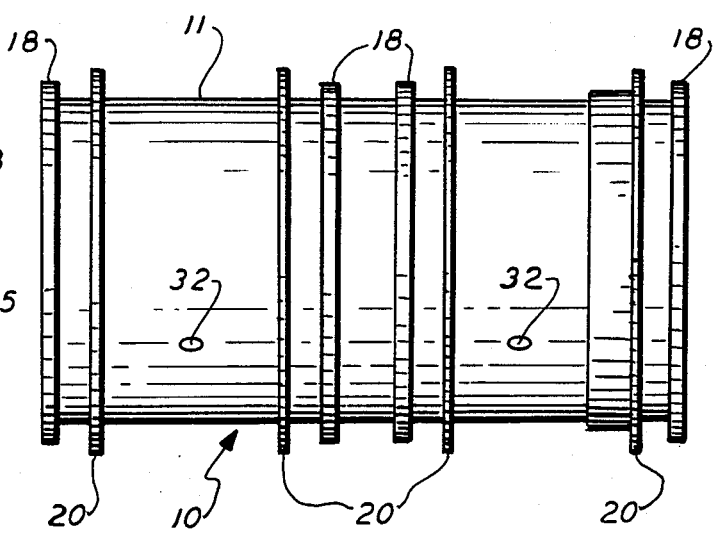
FIG. 2 is a side elevation of the wheel shown in FIG. 1.
Figure 3:
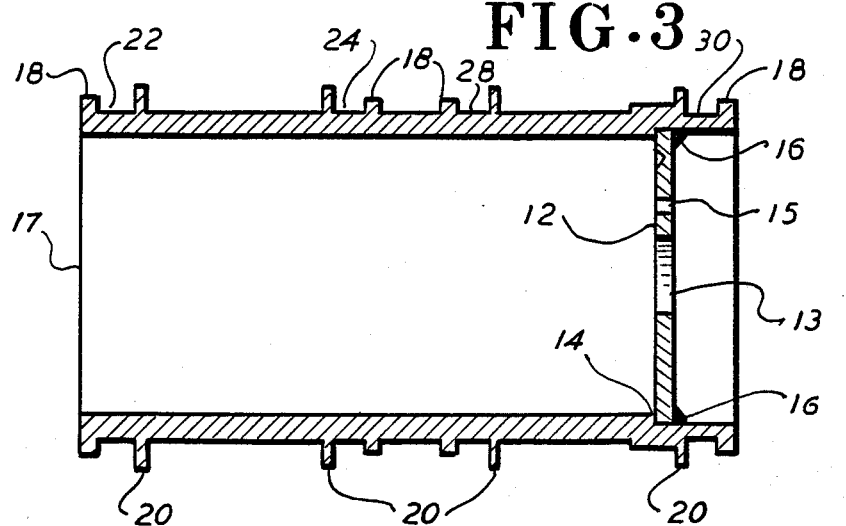
FIG. 3 is a cross-sectional view taken approximately along the line 3—3 of FIG. 2.
Figure 4:
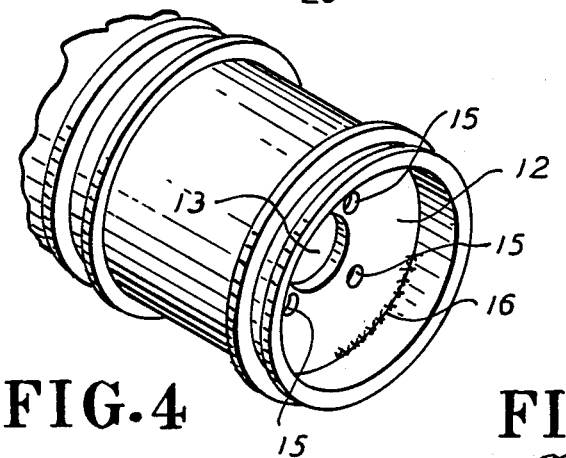
FIG. 4 is a perspective view showing the end of the wheel opposite the end shown in FIG. 1.
Figure 5:
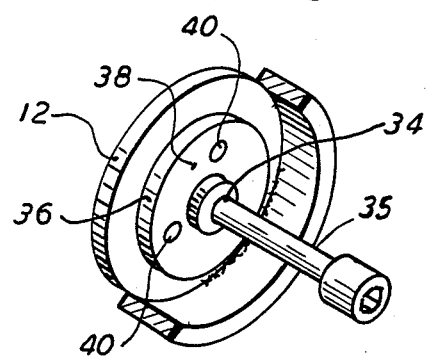
FIG. 5 is an enlarged detailed view showing the cooperation of the adapter and the wheel.

Referring to the drawings, and particularly to FIG. 1, the reference numeral 10 designates generally a wheel or rim constructed in accordance with the present invention and having a body 11. As will be seen, the body 11 is tubular in form and is closed adjacent a first end by a web 12. The body 11 is formed interiorly with a shoulder 14 and the web 12 is press fitted against it. Suitably the web 12 is braised to the body 11, as shown at 16, in order to hold it securely in place. If desired, the body 11 may also be formed with a shoulder (not shown) at its opposite or second end in order that the web 12 may be inserted at either end of the body during the manufacture of the wheel.

The web 12 is formed with a central aperture 13 and three circumferentially-spaced apertures 15, which are concentrically arranged relatively to the larger central aperture 13. The purpose of apertures 13 and 15 will become apparent as the description proceeds. On the side facing the second end 17, the web 12 can be preferably formed with decorative circular depressions or recesses arranged in a circle concentrically in relation to the circle of apertures 15.

Exteriorly, the body 11 is formed with a plurality of radially-extending fins 18 and 20. The fins 18 have a slightly greater thickness and a slightly lower height than the fins 20 in the embodiment illustrated, but the two sets of fins can be of equal height and/or of equal thickness, if desired. They are spaced from one another as illustrated to form a channel 22 and a channel 24 which will accommodate the edge portions or beads of a first tire and the fins are similarly spaced from each other to form a channel 28 and a channel 30 for accommodating the edge portions or beads of a second tire. Vent holes 32 make possible automatic pressure equalization within the tires when they are mounted upon the rim. The wheel or rim 10 is thus effectively constructed for the dual mounting of tires (not shown) in parallel relationship.

Figure 6:
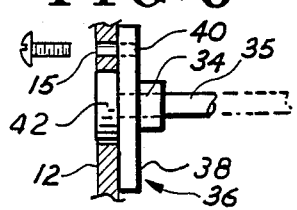
FIG. 6 is a side elevation showing the adapter seen in FIG. 5.

Shown at the left in FIG. 6 in broken lines is the threaded end 34 of an axle 35 of a radio-controlled model automobile and, constructed to be threadedly engaged with the threaded end 34 is an adapter unit or member 36, which has a disc-like circular body 38, which is formed with three threaded apertures 40 in circumferentially-spaced relationship and with a circular raised portion 42 and an interiorly threaded stem 43. When the adapter is employed, the raised portion 42 of body 38 is received in central aperture 13. Screws are then inserted through apertures 15 in web 12 and these screws are threadedly engaged with apertures 40 in the body 38 of the adapter 36. When the adapter 36 is then threadedly engaged with the end 34 of the axle via stem 43, the wheel or rim 10, and any tires carried by it, are securely attached to the vehicle, i.e., a radio-controlled automotive vehicle, with which they are used.

It will be apparent that various changes and modifications may be made without departing from the invention as defined in the appended claims and it is intended, therefore, that all matter contained in the foregoing description and in the drawing shall be interpreted as illustrative only and not in a limiting sense.

What is claimed is:

1. A dual wheel for supporting two tires in parallel relationship, comprising:

a unitary integral cylindrical rim body having at least four pairs of flanges, each flange extending radially outwardly from the exterior of said rim body in parallel relationship, each said flange pair defining therebetween a space for receiving the bead of a tire, whereby at least two tires can be mounted in parallel thereon; said body being open at one end, and having near the other end a transverse web; and means secured to said web for enabling said web to be secured to an end of a vehicle axle.

2. A dual wheel as defined in claim 1, wherein said body has two ends and is formed with an interior shoulder adjacent one of said ends and said web engages said shoulder.

3. A dual wheel as defined in claim 1, wherein said member further comprises means for receiving securing means for securing said member to said web.

4. A dual wheel as defined in claim 3 wherein said member has a disc-like circular configuration and said means for receiving securing means comprise tapped apertures and said securing means comprise screws.

5. A dual wheel in accordance with claim 1, wherein said means securable to said web has a disc member securable to said web, a first raised portion projecting from said disc receivable into a central aperture in said web; and a second raised portion on the opposite side of said disc, having a threaded aperture for receiving a threaded end of said vehicle axle.

6. A dual wheel in accordance with claim 1, for use with a radio-controlled or small scale vehicle.

* * * * *